United States Patent [19]

Hayashi

[11] Patent Number: 5,994,916

[45] Date of Patent: Nov. 30, 1999

[54] LCD PANEL TEST SYSTEM AND TEST METHOD THEREOF

[75] Inventor: Masaki Hayashi, Hanyu, Japan

[73] Assignee: Advantest Corp., Tokyo, Japan

[21] Appl. No.: 08/868,506

[22] Filed: Jun. 4, 1997

[30] Foreign Application Priority Data

Jun. 5, 1996 [JP] Japan ..................... 8-165385

[51] Int. Cl.⁶ .......................... G01R 31/02; G01R 31/28; G02F 1/13; G09G 3/00

[52] U.S. Cl. .......................... 324/770; 324/500; 324/537; 324/548; 345/904

[58] Field of Search ..................... 324/765–770, 324/158.1, 500, 537, 548; 345/904, 94, 98

[56] References Cited

U.S. PATENT DOCUMENTS 5,506,516  4/1996  Yamashita et al. .................. 324/770
5,576,730  11/1996  Shimada et al. .................... 324/770 X
5,608,558  3/1997  Katsumi ............................ 324/770 X

*Primary Examiner*—Gerard Strecker
*Attorney, Agent, or Firm*—Muramatsu & Associates

[57] ABSTRACT

An LCD panel test system for measuring voltages in the pixels of LCD with high signal to noise (S/N) ratio. The LCD test system includes a sweep timing generator for generating clock signals and control signals for driving pixels in an LCD panel, a driver for generating a reference voltage to be supplied to the pixels in the LCD, a current-voltage (IV) conversion circuit for receiving a signal from the pixels to convert the same to a corresponding voltage signal, a sample and hold circuit for sampling the voltage signal from the IV conversion circuit and temporarily holding the sampled voltage, an A/D converter for converting the sampled voltage to a digital signal, and an image processor for processing the digital signal from the A/D converter to detect defective pixels in the LCD panel based on relative levels of the output signals from the video terminal.

15 Claims, 6 Drawing Sheets

LCD PANEL TEST SYSTEM AND TEST METHOD THEREOF

FIELD OF THE INVENTION

This invention relates to an LCD (Liquid Crystal Display) panel made of, for example, amorphous thin film transistors (TFT) to be used for a large sized flat display such as a projector, a rear transparent type TV and the like, and more particularly, to an LCD panel test system and test method thereof for accurately detecting defects in pixels consisting of the LCD panel.

BACKGROUND OF THE INVENTION

A liquid crystal display (LCD) panel is widely used as a computer monitor, a flat TV, a test instrument display and the like. A brief description is made regarding an LCD panel which is a device to be tested by the LCD panel test system of the present invention. An LCD panel includes a large number of pixels (picture elements) aligned in a matrix manner.

FIG. 3 shows an example of structure in an LCD panel made of amorphous TFT. In the LCD panel 10, a large number of gate lines $19_1$–$19_m$ which are parallel with one another are provided on a quartz substrate. A large number of data lines $20_1$–$20_n$ which are parallel with one another and perpendicular to the gate lines are also provided on the substrate. At each cross point of the gate line 19 and the data line 20, a pixel TFT (thin film transistor) 14 is established.

In each pixel TFT $14_{ij}$ ($14_{11}$–$14_{nm}$), a gate is connected to the gate line 19, a source is connected to the data line 20, and a drain is connected to an auxiliary capacitor $15_{ij}$ ($15_{11}$–$15_{nm}$) as shown in FIG. 3. The other end of the auxiliary capacitor $15_{ij}$ is commonly connected to a ground terminal 22. In this manner, a large number of pixels each of which is formed of the pixel TFT $14_{ij}$ and the auxiliary capacitor $15_{ij}$ are aligned in a matrix manner on the substrate.

The number of pixels in the LCD panel is, for example, 307,200 (640×480) in the VGA (Video Graphics Array) standard, 480,000 (800×600) in the SVGA (Super Video Graphics Array) standard, and 786,432 (1,024×768) in the XGA (Extended Graphics Array) standard. In an EWS (Engineering Work Station) application, the number of pixels is further required to be as large as 1,310,720 (1,280× 1,024).

The gate lines $19_1$–$19_m$ are connected to corresponding registers in a row select shift register 11 having m stages of registers. The data lines $20_1$–$20_m$ are connected to corresponding video lines 21 through column select switches $13_i$ ($13_1$–$13_n$). The column select switches $13_i$ are made of thin film transistors. Each gate of the thin film transistor of the column select switch 13 is connected to a corresponding register in a column select shift register 12 having n stages of registers.

When the number of pixels is large, for achieving a high speed operation, a plurality of video lines 21 and column select shift registers 12 may be employed in the LCD panel. In such a case, the number of video lines is typically 2–6, but sometimes, the video lines up to 24 may be used. The number of column select registers 12 may be 2–4 which are perpendicular with one another.

The row select shift register 11 has a terminal DY for receiving a vertical drive signal and a clock terminal CLY for receiving a vertical operation clock. In receiving the vertical drive signal and the vertical operation clock, the row select shift register 11 sequentially generates a high level signal at one of the registers for every horizontal sweep. Namely, the high level signal is provided sequentially at one of the gate lines $19_1$–$19_m$ for every horizontal sweep.

The column select register 12 has a terminal DX for receiving a horizontal drive signal and a clock terminal CLY for receiving a horizontal operation clock. In receiving the horizontal drive signal and the horizontal operation clock, the column select shift register 12 sequentially generates a high level signal at one of the registers for every pixel cycle. Namely, the high level signal is provided sequentially at one of the data lines $20_1$–$20_m$ for every cycle of the horizontal operation clock.

Therefore, for example, during the period when the gate line $19_1$ is in the high level, the gate of the column select switch $13_1$ becomes high level. As a consequence, the pixel TFT $14_{11}$ goes ON so that the video signal from the video line 21 is charged in the auxiliary capacitor $15_1$ through the drain and source of the pixel TFT $14_{11}$. The charge stored in the auxiliary capacitor $15_{11}$ represents the signal level of the incoming video signal.

During the time when the gate line $19_1$ is in the high level, the column select switches $13_1$–$13_m$ are consecutively driven to a high level, one by one, by the horizontal operation clock. Thus, the pixel TFTs $14_{11}$–$14_{1n}$ are sequentially set to ON so that the video signal from the video line 21 corresponding to the pixel point is charged in the corresponding auxiliary capacitors $15_{11}$–$15_{1n}$. In this manner, all the pixels connected to the gate line $19_1$ are swept by the horizontal operation clock. In the next horizontal sweep, the gate line $19_2$ is set to the high level, and the horizontal sweep is performed for the pixels connected to the gate line $19_2$.

This horizontal sweep is repeated for all the pixels in the LCD panel provided with video signals from the video line 21. When all the gate lines 19 are scanned in this manner, a picture is formed on the LCD panel. Similar to the known television technology, such pictures are produced on the LCD panel several ten times or more per second to show images without flickers.

An LCD panel test system is used for testing LCD panels having a large number of pixels as in the above noted example. Two types of failure are usually exhibited in such an LCD panel, one is line defect and the other is pixel defect. The line defect means an existence of an open circuit in the various lines and components in the LCD panel. Thus, the line defect can be relatively easily identified when testing an LCD panel in performing a conduct/non-conduct test by an LCD test system.

The pixel defect means failures in the pixel, i.e., the charge and discharge operation in the auxiliary capacitors of the pixels. The pixel defect includes open defect in which the auxiliary capacitor is open circuited and short defect in which the auxiliary capacitor is short circuited. When the auxiliary capacitor works properly, the video signal is correctly charged in the capacitor. When the auxiliary capacitor has either the open defect or the short defect, it cannot properly charge the video signal.

Several methods of testing the pixel defect have been introduced. One of the methods is disclosed in the Japanese Patent Publication No. 5-158056 filed by the same assignee of the present invention. This example is described with reference to FIG. 5. In this conventional method, when detecting the pixel defect, a rectangular signal is provided to a common ground terminal 22 of the LCD panel. As shown in FIG. 3, the common ground terminal 22 is commonly connected to all the auxiliary capacitors $15_{ij}$ of the pixels. At the same time, voltage levels corresponding to the pixels at the video output lines 21 of the LCD panel 10 are monitored. On the basis of the voltage levels, the pixel defect is detected to evaluate the quality of the LCD panel 10.

The LCD panel test system of FIG. 5 includes a sweep timing generator 30, a test signal generator 31, a high speed switch 32, an impedance converter 33, a sample and hold circuit 34, an amplifier 35, an A/D converter 36 and an image processor 37. The LCD panel 10 in FIG. 5 is shown in more detail in FIG. 3 as discussed above.

In testing the LCD panel 10, a vertical drive signal and a vertical operation clock, both from the sweep timing generator 30, are applied to the DX terminal and the CLY terminal, respectively. Further, a horizontal drive signal and a horizontal operation clock, both from the sweep timing generator 30, are applied to the DX terminal and the CLX terminal, respectively.

As noted above, the common ground terminal 22 is commonly connected to all the auxiliary capacitors $15_{ij}$ of the pixels. The test signal generator 31 provides a test signal, such as a rectangular signal, to the common ground terminal 22 of the LCD panel 10. The application timing of the rectangular signal is, for example, at the intermediate of each switching (selection) period of the pixels. At the timings of the beginning and ending of each switching period, a discharge operation is performed as will be explained later.

When the selected pixel functions properly, an output signal having a voltage proportional to the test signal is produced at the video terminal 23 through the video line 21 of the LCD panel 10. For example, if the auxiliary capacitor $15_{ij}$ in question is short circuited, an output signal having a high level voltage is produced at the video terminal 23. In contrast, if the auxiliary capacitor $15_{ij}$ is open circuited, an output signal having a low level voltage is produced at the video terminal 23.

The high speed switch 32 is provided between the video terminal 23 and the common ground. At the beginning and ending of the selection period of the pixels, the high speed switch 32 is driven to ON so as to drain the electric charge stored in the stray capacitances connected to the video terminal 23.

The impedance converter 33 converts high impedance of the output signal at the video terminal 23 to low impedance to be supplied to the sample and hold circuit 34. The output signal from the terminal 23 is sampled at the timing close to the end of the rectangular test signal and holds its voltage for the analysis in the later stages of the test system. The sampled voltage from the sample and hold circuit 34 is amplified by the amplifier 35 whose output is connected to the A/D converter.

Thus, the output signal at the video terminal 23 is converted to a digital signal by the A/D converter 36. The digital signal is provided to the image processor 37 where the voltage levels relative to other pixels are evaluated to determine whether there is any defective pixels in the LCD panel 10.

In this conventional example of testing the LCD panel, the short defect (the auxiliary capacitor is short circuited) of the pixel is easily identified since the output signal from the video terminal becomes substantially large. However, the open defect (the auxiliary capacitor is open circuited) is not easily discernible because of a poor S/N (signal to noise) ratio in the output signals from the video terminal 23.

This is because the stray capacitances on the data lines $20_i$ and the video lines 21 in the LCD panel 10 are significantly large relative to the selected auxiliary capacitor $15_{ij}$ of the pixel. Thus, the output voltage at the video terminal 23 is affected by the stray capacitances whose reactance values are several ten times larger than the auxiliary capacitor $15_{ij}$ in question.

FIG. 4 shows an equivalent circuit of one of the pixels in the LCD panel of FIG. 3 when the pixel transistor TFT 14 is ON. In FIG. 4, R8 designates an ON resistance of the column select switch $13_i$ and R9 designates an ON resistance of the pixel transistor TFT $14_{ij}$. The ON resistance R8 is typically 10K ohm while the ON resistance R9 is typically 1M ohm. Also in FIG. 4, numeral 16 designates a stray capacitance on the data line 20 and numeral 17 designates a stray capacitance on the video line 21. Although the capacitance values of the stray capacitances 16 and 17 are dependent on the size of the LCD panel substrate, typically, the stray capacitance 16 is 5 pF and the stray capacitance 17 is 10 pF. On the other hand, the auxiliary capacitance $15_{ij}$ has a capacitance value of about 0.1 pF.

Since the auxiliary capacitance $15_{ij}$ of the pixel is less than $\frac{1}{100}$ of the sum of the stray capacitances of the data line 20 and video line 21, the voltage change in the capacitor $15_{ij}$ between the normal situation and the defective situation in the pixel is very small because of the large stray capacitors. Thus, in the conventional technology, it is difficult to accurately detect the open defect in the pixels of the LCD panel.

Further, in the conventional technology where the rectangular test signal is provided at the common ground terminal and the resultant signal is detected at the video terminal 23, a fine timing adjustment is necessary to discharge the voltages in the stray capacitors by the external switch as described above. Since this test procedure involves the delicate timing adjustment, it is complicated and time consuming.

SUMMARY OF THE INVENTION

Therefore, it is an object of the present invention to provide an LCD panel test system and test method thereof which is capable of accurately detecting defects in the pixels in the LCD panel under test with high sensitivity.

It is another object of the present invention to provide an LCD panel test system and test method thereof which is capable of easily testing the quality of the pixels in the LCD panel without involving a delicate timing adjustment.

It is a further object of the present invention to provide an LCD panel test system and test method thereof which is capable of detecting the defective pixels in the LCD panel with a relatively simple and easily understandable test process.

In the present invention for testing an LCD panel 10 of FIG. 3, each auxiliary capacitor $15_{ij}$ is given a large voltage, such as proximate to the maximum rated voltage of the LCD panel under test so that the auxiliary capacitor charges up to its maximum voltage. On the other hand, the stray capacitors of the data line and the video line are given a ground voltage so as to be discharged to the zero voltage. By this process, the S/N ratio is improved more than ten times than the conventional method so that the open defect as well as the short defect of the pixels can be effectively detected.

More specifically, in testing the LCD panel 10 by the test system of the present invention, a common ground terminal 22 for auxiliary capacitors $15_{ij}$ of the LCD panel 10 is connected to the ground. Each pixel transistor TFT is driven to ON while a video terminal 23 is given a high level reference voltage of the test signal. Preferably, as noted above, the high reference voltage is proximate to the maximum rated voltage of the LCD panel under test so that the auxiliary capacitor charges up to its maximum allowable voltage.

Then, each pixel transistor TFT is driven to OFF while the video terminal 23 is given by a low level reference voltage of the test signal. Preferably, the low level reference voltage is the common ground voltage of the LCD panel 10. Column select switches 13 are sequentially driven to ON by a horizontal clock rate and thus the data lines $20_i$ are electrically connected to the video terminal 23 through the video line. Therefore, the stray capacitances of the data line 20 and the video line 21 are sufficiently discharged to the ground voltage level.

Again, each pixel transistor TFT is sequentially driven to ON by the horizontal clock rate so that the voltage in the corresponding auxiliary capacitor $15_{ij}$ is transmitted through the video terminal 23 to the sample and hold circuit and the A/D converter, as in the conventional technology, and is evaluated by the image processor whether any defect exists in the LCD panel under test.

For doing this, the LCD test system of the present invention includes a sweep timing generator for generating clock signals and control signals for driving the pixels in the LCD panel, a driver for generating a reference voltage to be supplied to a video terminal of the LCD panel where outputs of the pixels are connected thereto, a current-voltage (IV) conversion circuit for supplying the reference voltages from the driver to the video terminal and receiving an output signal from the video terminal to convert the same to a corresponding voltage signal, a sample and hold circuit for sampling the voltage signal from the IV conversion circuit and temporarily holding the sampled voltage, an A/D converter for converting the sampled voltage from the sample and hold circuit to a corresponding digital signal, and an image processor for processing the digital signal from the A/D converter to detect defective pixels in the LCD panel based on relative levels of the output signals from the video terminal.

According to the present invention for testing an LCD panel 10, each auxiliary capacitor $15_{ij}$ is given a high level reference voltage so that the auxiliary capacitor charges up to its maximum voltage. On the other hand, the stray capacitors of the data line and the video line are given a ground voltage so as to be discharged to the zero voltage. As a result, the S/N ratio is significantly improved so that the open defect as well as the short defect of the pixels can be effectively detected.

Further, since the conventional technology where the rectangular test signal is provided at the common ground terminal and the resultant signal is detected at the video terminal 23 requires a fine timing adjustment to discharge the voltages in the stray capacitors, the test procedure involves the delicate timing adjustment, and thus it is complicated and time consuming. In the present invention, because the write period for charging the reference voltage in the pixels and the discharge period for discharging the stray capacitors are separately provided and such time periods are determined by the clock signals of the LCD panel, delicate timing adjustments are unnecessary.

DETAILED DESCRIPTION OF THE PREFERRED EMBODIMENT

Figure 1:
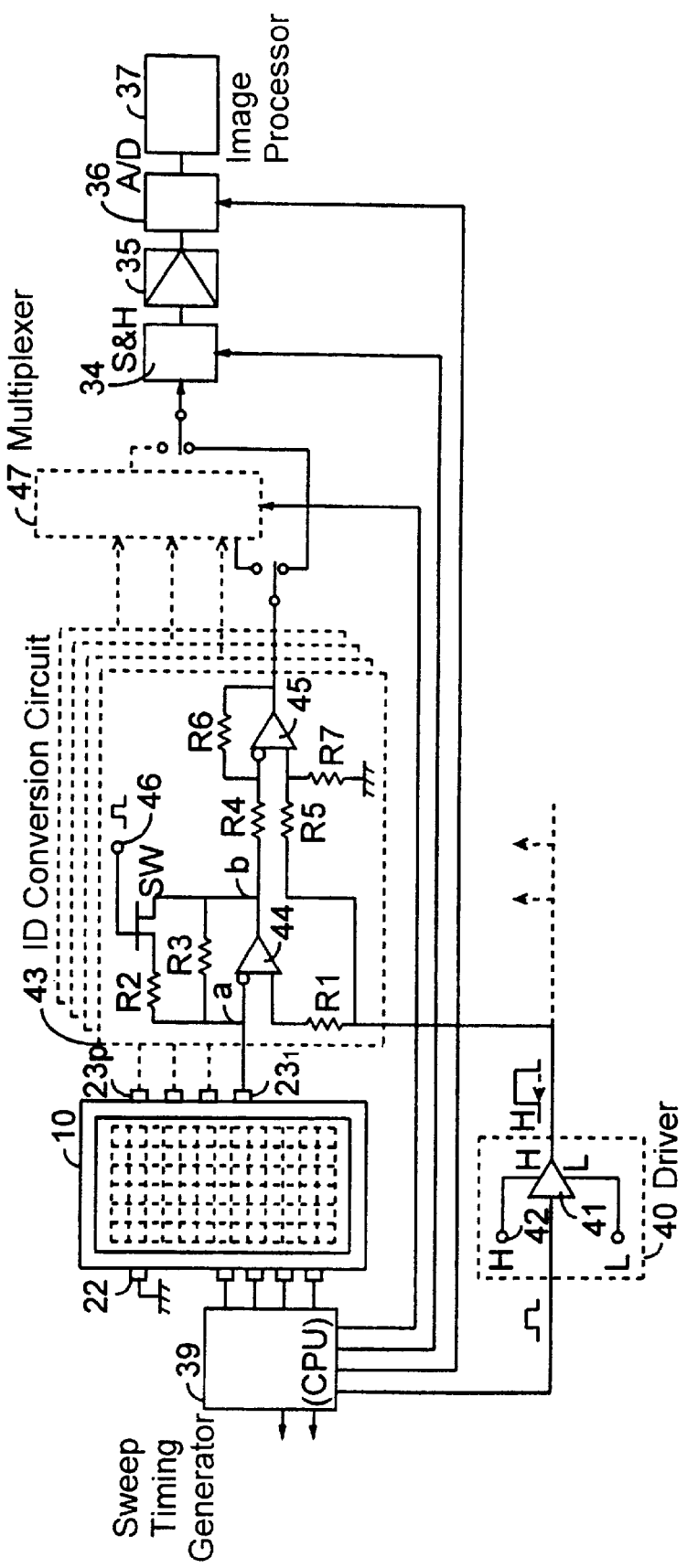
FIG. 1 is a block diagram showing an example of structure in one of the embodiments of the LCD test system of the present invention.

FIG. 1 shows a basic configuration of the LCD test system of the present invention. The LCD test system includes a sweep timing generator 39, a driver 40, an IV (current-voltage) conversion circuit 43, an analog multiplexer 47, a sample and hold circuit 34, an amplifier 35, an A/D converter 36 and an image processor 37. An LCD panel 10 in FIG. 1 is shown in more detail in FIG. 3 as discussed above.

The sweep timing generator 39 generates various timing signals and control signals including vertical and horizontal clock signals, a gate control signal, vertical and horizontal drive signals to be applied to the LCD panel under test and a test signal to be applied to the driver 40. The sweep timing generator 39 has, in this case, a CPU to control the overall operation of the timing generation, although such a controller can be provided separately.

The driver 40 generates, in real time, a high level reference voltage and a low level reference voltage based on the test signal from the sweep timing generator 39. The high reference voltage and the low reference voltage from the driver 40 are applied to the LCD panel 10 through the IV conversion circuit 43 and a video terminal 23. The IV conversion circuit 43 converts the current of the video signal from the video terminal 23 to a corresponding voltage signal and supplies the same to the sample and hold circuit 34. The more details of the IV conversion circuit 43 and the test signals will be given later.

In case where the LCD panel 10 is provided with an extremely large number of pixels such as in an EWS (Engineering Work Station) application, a plurality of video lines $23_1$–$23_p$ will be provided accordingly. To test such an LCD panel having two or more video terminals, two or more IV conversion circuits 43 corresponding to such video terminals will be provided as shown in FIG. 1.

Each of the IV conversion circuits 43 applies the test signal to the corresponding video terminal 23 and receives the video signal from the video terminal and converts the same to a voltage signal. In receiving the voltage signals from the IV conversion circuits 43, the analog multiplexer 47 selects one of the voltage signals based on the control signal from the sweep timing generator 39 and transmits the same to the sample and hold circuit 34. The output of the sample and hold circuit 34 is provided to the A/D converter 36 through the amplifier 35 as in the conventional technology and is evaluated by the image processor 37 as to whether any defect exists in the LCD panel 10 under test.

In FIG. 1, the terminal 22 which is a common ground terminal of the pixels in the LCD panel 10 (shown in more detail in FIG. 3) is connected to the ground. The driver 40 generates the high and low voltage test signal by switching the reference voltages H and L based on the test signal from the sweep timing generator 39. For example, the high reference voltage H is 12 V while the low reference voltage L is 0 V (common ground voltage).

Preferably, an operational amplifier 41 is used in the driver 40 to switch the high voltage test signal and the low voltage test signal in real time. Although the driver 40 can also be formed by a transistor switch circuit or a bistable multivibrator circuit, the operational amplifier 41 is preferable since it can realize the high speed switching between the high voltage reference H and the low voltage reference voltage L with high voltage accuracy.

The IV conversion circuit 43 is preferably formed of at least two differential amplifiers. The reference voltages from the driver 40 is provided at a non-inverting input terminal of each differential amplifier. An inverting input terminal of the first stage differential amplifier is connected to the video terminal 23 of the LCD panel under test to supply the reference voltages H and L from the driver 40. The reference voltage H is used to charge the auxiliary capacitors in the pixels and the reference voltage L is used to discharge the stray capacitors associated with the data line and video line in the LCD panel.

More specifically, the IV conversion circuit 43 includes differential amplifiers 44 and 45 as shown in FIG. 1. The non-inverting input terminals of the differential amplifiers 44 and 45 are provided with the reference voltages from the driver 40 through resistors R1 and R5, respectively. The inverting input terminal "a" of the differential amplifier 44 is connected to the video terminal 23 of the LCD panel under test as well as to its output terminal "b" through a resistor R3. Preferably, a resistor R2 and a switch SW are also connected between the terminals "a" and "b" in parallel with the resistor R3 in order to attain the optimum feedback resistance. The switch SW is driven by a switch control signal from the sweep timing generator (CPU) 39 via a terminal 46.

For example, to achieve the stability of the feedback circuit such as the circuit arrangement associated with the differential amplifier 44, the feedback resistance needs to be small to increase the amount of feedback. On the other hand, to increase the amplifier gain, feedback resistance needs to be large. Thus, the switch SW is set to ON when the stability of the amplifier is required rather than the high overall gain. In the arrangement of FIG. 1, the reference voltages H and L from the driver 40 are supplied to the video terminal 23 from the differential amplifier 44 through the resistors R2, R3 and the switch SW.

As an example, the resistor R2 is 1K ohm and the resistor R3 is 40K ohm. When supplying the reference voltages H and L to the LCD panel 10 to be tested, the switch SW is set to ON by the switch control signal form the terminal 46 so that the overall feedback resistance is about 1K ohm. In this setting, the differential amplifier 44 achieves the high stability with wide bandwidth while the amplifier gain is low. Thus, the test system can provide the reference voltages to the LCD panel based on the high speed clock generated by the sweep timing generator 39.

When measuring the output voltages from the video terminal 23, the switch SW is set to OFF by the switch control signal form the terminal 46 so that the overall feedback resistance is about 40K ohm. In this setting, the differential amplifier 40 achieves the high gain with narrow bandwidth. Thus, the test system can read the output voltages from the video terminal 23 with high gain while with relatively low speed to match with the speed of the later circuit arrangement of the test system such as an A/D conversion speed.

The differential amplifier 45 is to provide a limited range of output signal to the sample and hold circuit since the sample and hold circuit 34 and the A/D converter do not have a large dynamic range. Resistors R4–R7 have the same resistance value so that the output of the differential amplifier 45 is close to zero volt when the two input signals of the amplifier 45 are the same.

In the foregoing example, the IV conversion circuit is used to apply the high and low reference voltages to the LCD panel through the video terminal 23 and to receive the output voltages from the video terminal. However, other arrangement for applying the reference voltage to the video terminal 23 is also possible. For example, a switch will be provided which is connected to the video terminal at its one end and the other end can be switched either to the driver 40 or the IV conversion circuit 43.

Figure 2:
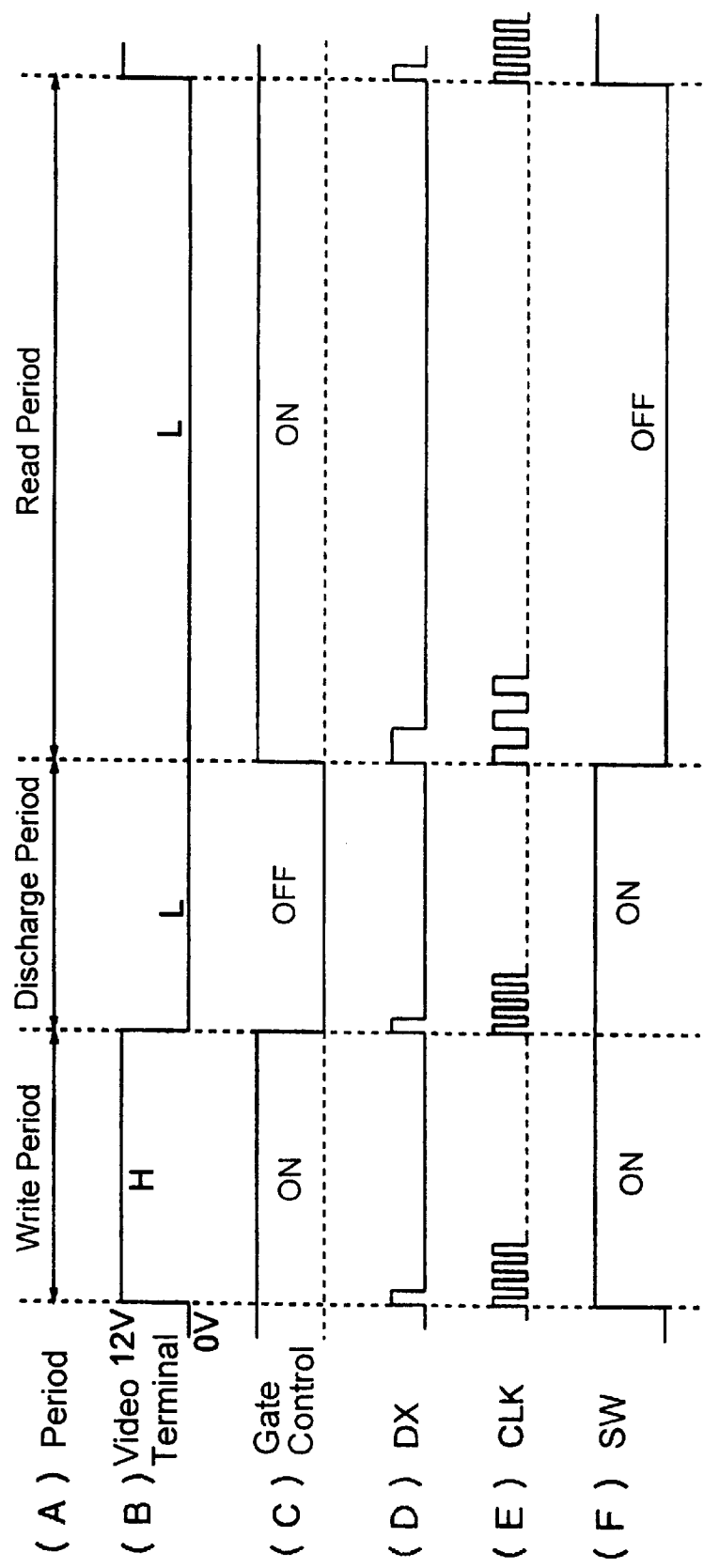
FIG. 2 is a timing chart showing operations in the LCD test system of FIG. 1.

FIG. 2 is a timing chart showing an example of operation in the LCD test system of FIG. 1. Row select periods are shown in FIG. 2A in which one of the rows of the pixels is selected in the illustrated periods for the purpose of testing the LCD. The row select is performed by the operation of the row select shift register in FIG. 3 in synchronism with the vertical clock signal CLY. The other rows in the LCD will be sequentially selected after testing the pixels in one selected row. During each of the row select periods, the column select shift register is performed in synchronism with the horizontal clock signal CLX shown in FIG. 3. The horizontal clock is also shown in FIG. 2E in the timing chart.

As shown in FIG. 2A, in this example, the first row select period (write period) is for writing the pixels in the selected row, the second row select period (discharge period) is for discharging the stray capacitors of the data lines 20 and the video lines 21 in the pixels in the selected row, and the third row select period (read period) is for reading the output signal of the video terminal 23.

The high reference voltage H from the driver 40 is given to the selected pixels through the IV conversion circuit 43 in the write period. The low reference voltage L is given to the data lines 20 and video lines 21 through the IV conversion circuit 43 in the discharge period as shown in FIG. 2B. Also shown in FIG. 2B, the low reference voltage L from the driver 40 is given to the IV conversion circuit during the read period.

The gate control signal of FIG. 2C is provided by the sweep timing generator 39 to ON/OFF control the pixel transistors TFT 14 in the selected row through the AND gate 18 and the gate line 19. In the write period, the gate control signal is in the high level to charge the reference voltage H in the auxiliary capacitors 15 through the transistors TFT 14. In the discharge period, the control signal goes low to turn off the transistors TFT 14 and discharge the voltage in the stray capacitors. In the read period, the gate control signal goes to the high level again to read the voltage in the auxiliary capacitors 15 in the pixels. The gate control signal is applied to the gate control terminal of FIG. 3. If there is no gate control terminal on the LCD panel under test, the same function will be performed by producing the low level (non-select) signals for all the rows in the LCD panel by the row select shift register.

In each of the above periods, the pixels in the selected row are switched by the timing of the horizontal clock CLK shown in FIG. 2E. At the start of the each period, the horizontal drive signal DX is provided to initiate the operation of the column shift register 12 as shown in FIG. 2C. During the write period and the discharge period, since the measurement circuits such as the A/D converter are not working, the repetition rate of the clock CLK is the rated speed to be used in the LCD. In contrast, in the read period, the lower repetition rate may preferably be used as shown in FIG. 2 since the signal processing such as the A/D conversion requires longer time to repeatedly convert the analog signal to a corresponding digital signal.

In the IV conversion circuit 43, the switch SW is ON during the first and second periods and is OFF in the third period as shown in FIG. 2F. Thus, in the first (write) and second (discharge) period, the resistor R2 is connected in parallel with the resistor R3 to make the overall feedback resistance small such as about 1K ohm. As a result, the differential amplifier 44 has a small gain with wide bandwidth to achieve the high speed operation.

In the third (read) period, the switch SW in the IV conversion circuit 43 is OFF so that only the feedback resistor R3 is connected between the output and input of the differential amplifier 44. Thus, the feedback resistance is 40K ohm which establishes a high amplifier gain to read the output signal from the video terminal 23 with high sensitivity. Also during the read period, because of the longer clock period than that of the write or discharge period, the voltages in the auxiliary capacitor are fully discharged to be ready for the normal LCD operation.

In the above example of FIG. 2, the pixels are selected and tested by the unit of one row. It is not necessary to test the pixels by the unit of one row but the several rows can be selected and tested at the same time. In such a situation, two or more rows are selected by the row select shift register and the reference voltages H and L are provided in the same manner as noted above. In the read period, if the LCD has two or more video terminals, the corresponding IV conversion circuits receive the respective output signals one of which is selected by the multiplexer 47 to be supplied to the sample and hold circuit 34 and A/D converter 36.

Figure 6:
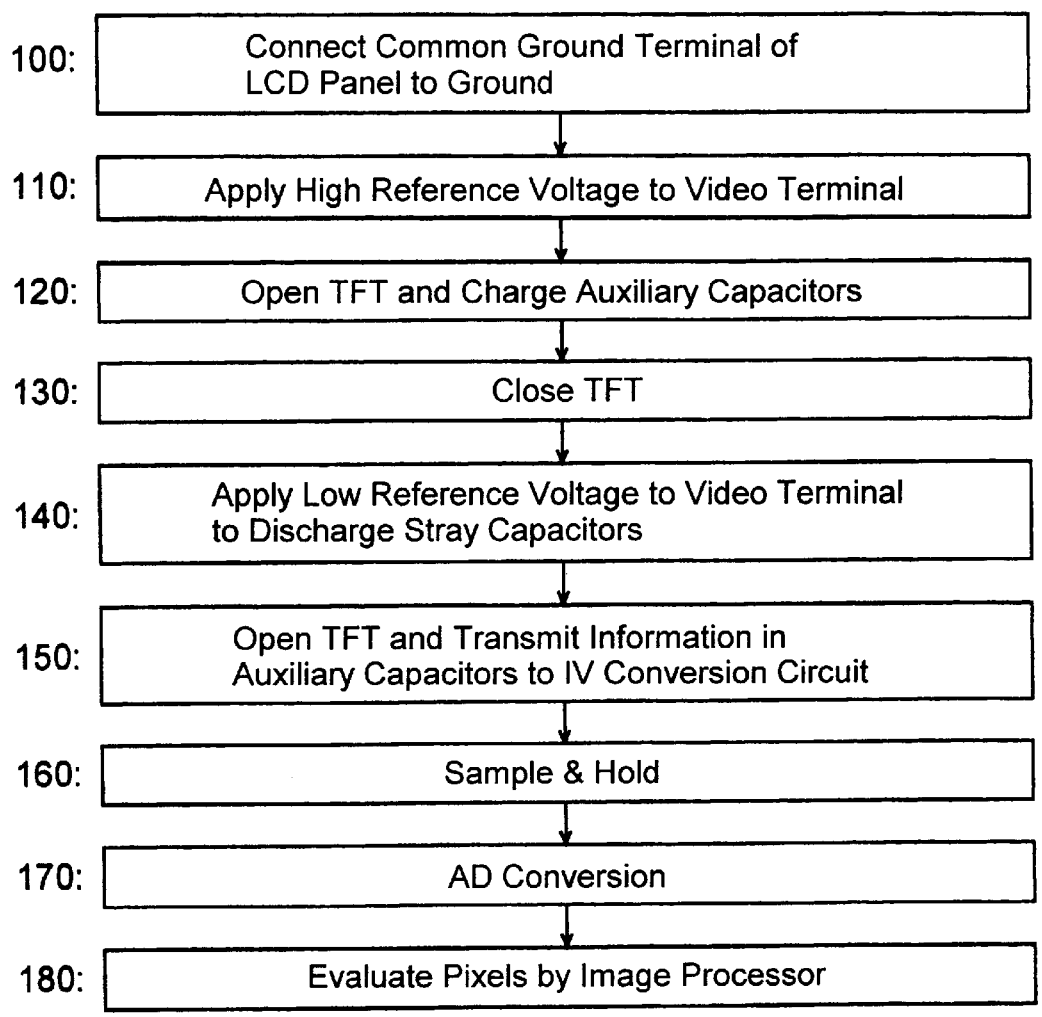
FIG. 6 is a flow chart showing a process of testing an LCD panel by the present invention.

FIG. 6 is a flow chart showing the LCD panel test process of the present invention. First, in the step 100, the common ground terminal for the pixels in the LCD panel to be tested is connected to the ground. Then, the high reference voltage H from the driver 40 is applied to the video terminal 23 through the IV conversion circuit 43 in the step 110. In the step 120, the pixel transistors TFT are provided with the gate control signal to open the transistors so that the auxiliary capacitors 15 are charged by the reference voltage H.

After the auxiliary capacitors are charged by the reference voltage H, the pixel transistors are set to OFF by the gate control signal in the step 130. The discharge process is performed for the stray capacitors on the data lines and video lines in the LCD panel under test by supplying the low level reference voltage to the video terminal 23 in the step 140.

In the read period, the pixel transistors TFT are again set to ON so that the information in the auxiliary capacitors 15 is read out through the video terminal 23 and the IV conversion circuit 43 in the step 150. In the step 160, the output voltage from the IV conversion circuit is sampled and held by the sample and hold circuit 34. The analog voltage held in the sample and hold circuit 34 is converted to the digital signal by the A/D converter 36 in the step 170 and evaluated as to whether the pixels in the LCD are defective or not by comparing the voltages of the digital signal by the image processor 37 in the step 180.

Figure 3:
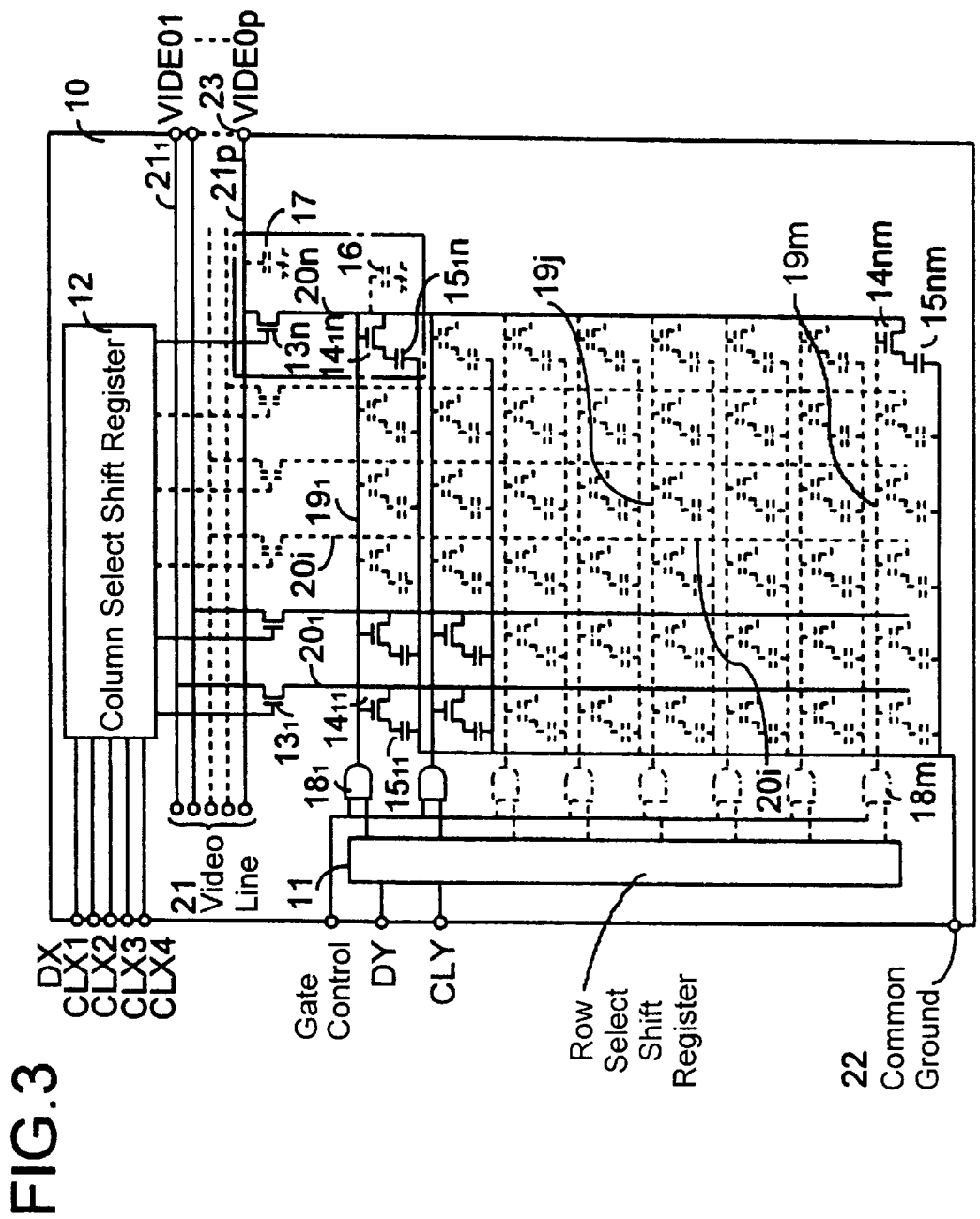
FIG. 3 is a circuit diagram showing an example of structure of an LCD panel to be tested by the LCD panel test system.
Figure 4:
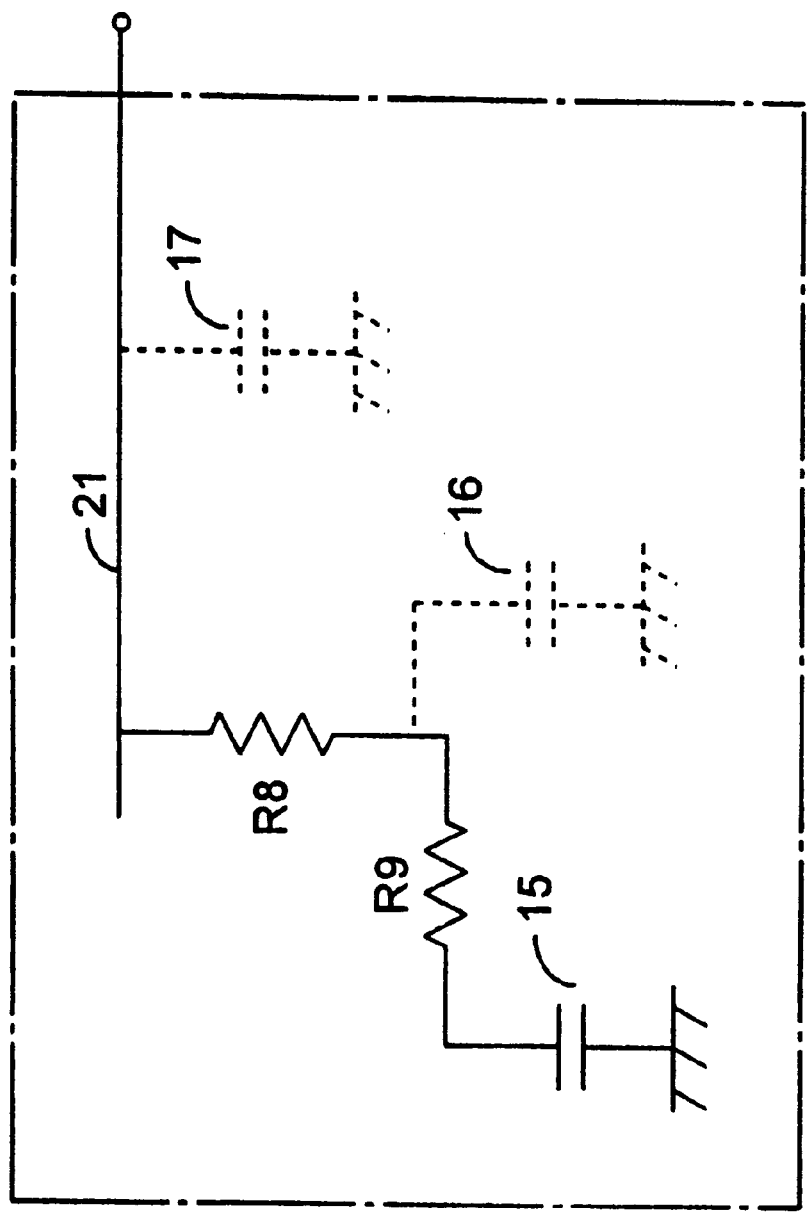
FIG. 4 is a schematic diagram showing an equivalent circuit of one of the pixels in the LCD panel when the pixel is in an ON state.
Figure 5:
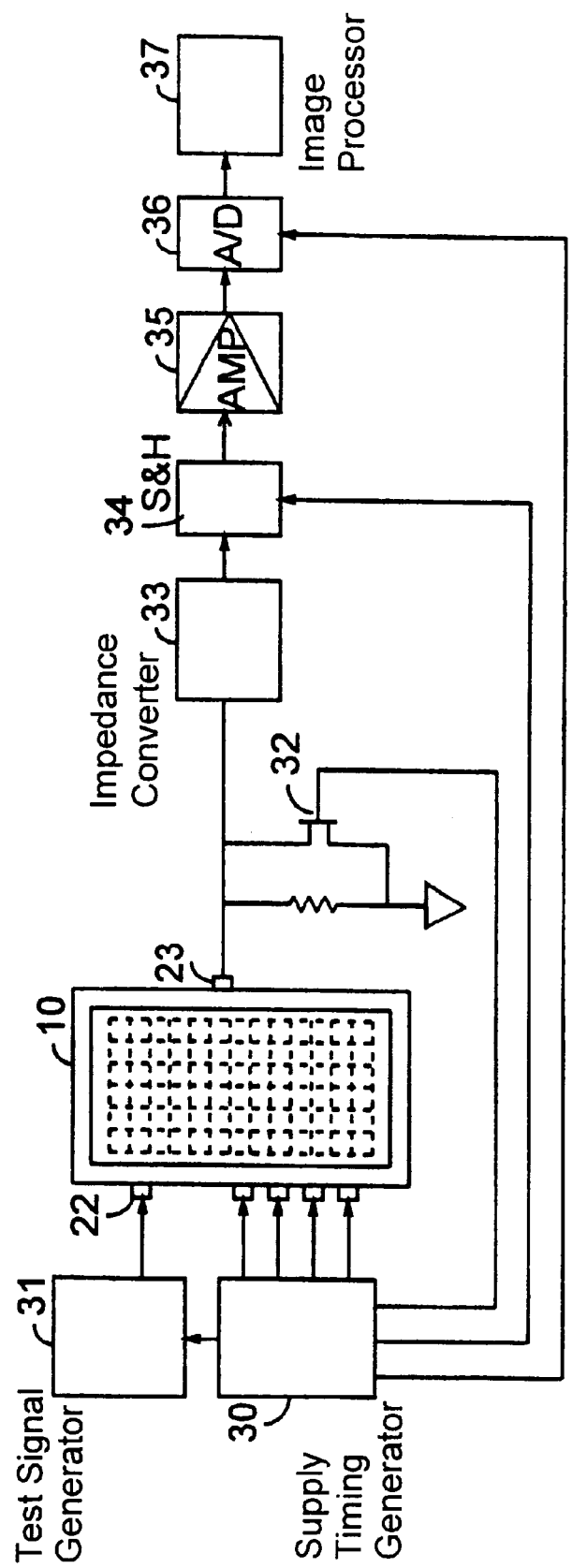
FIG. 5 is a block diagram showing an example of conventional LCD test system.

As described in the foregoing, according to the present invention for testing an LCD panel 10 of FIG. 3, each auxiliary capacitor $15_{ij}$ is given a large reference voltage so that the auxiliary capacitor charges up to its maximum voltage. On the other hand, the stray capacitors of the data line and the video line are given a ground voltage so as to be discharged to the zero voltage. As a consequence of this process, the S/N ratio is improved more than ten times higher than the conventional method so that the open defect as well as the short defect of the pixels can be effectively detected.

Further, since the conventional technology where the rectangular test signal is provided at the common ground terminal and the resultant signal is detected at the video terminal 23 requires a fine timing adjustment to discharge the voltages in the stray capacitors, the test procedure involves the delicate timing adjustment. In the present invention, because the write period for charging the reference voltage in the pixels and the discharge period for discharging the stray capacitors are separately provided and such time periods are determined by the clock signal of the LCD panel, delicate timing adjustments are unnecessary.

What is claimed is:

1. An LCD (Liquid Crystal Display) panel test system for testing an LCD panel having a large number of pixels, comprising:

a sweep timing generator for generating clock signals and control signals for driving said pixels in said LCD panel;

a driver for generating a reference voltage to be supplied to a video terminal of said LCD panel where outputs of said pixels are connected thereto;

a current-voltage (IV) conversion circuit for supplying said reference voltage from said driver to said video terminal in a first period and receiving an output signal from said video terminal to convert the same to a corresponding voltage signal in a second period following said first period;

a sample and hold circuit for sampling said voltage signal from said IV conversion circuit and temporarily holding the sampled voltage;

an A/D converter for converting the sampled voltage from said sample and hold circuit to a corresponding digital signal; and an image processor for processing said digital signal from said A/D converter to detect defective pixels in said LCD panel based on relative levels of said output signals from said video terminal.

2. An LCD panel test system as defined in claim 1, wherein each of said pixels is formed of a pixel transistor having a field effect transistor structure which is ON/OFF controlled by a gate control signal from said sweep timing generator when testing said LCD panel and an auxiliary capacitor which stores voltage corresponding to said reference voltage when testing said LCD panel, and a common ground terminal which is commonly connected to all of said pixels in said LCD panel is connected to the ground when testing said LCD panel.

3. An LCD panel test system as defined in claim 2, wherein said first period consists of a write period and a discharge period, said reference voltage includes a high level reference voltage to be charged in said auxiliary capacitor in said write period of an LCD test process and a low level reference voltage to discharge voltages in stray capacitors associated with internal lines connected to said pixel transistors in said discharge period of said LCD test process.

4. An LCD panel test system as defined in claim 3, wherein said second period is a read period following said write period and said discharge period for reading signals stored in said auxiliary capacitors in said pixels.

5. An LCD panel test system as defined in claim 4, wherein said LCD panel under test has a row select shift register for selecting a plurality of pixels aligned in the same horizontal line of said LCD panel in synchronism with a vertical clock signal and a column select shift register for selecting said one of said pixels aligned in said horizontal line in synchronism with a horizontal clock signal, said row select shift register selecting said pixels in one horizontal lines during said write period based on an instruction from said sweep timing generator, said reference voltage being provided through said video terminal to said auxiliary capacitors in said pixels in said horizontal line to store the voltage corresponding to said reference voltage by sequentially selecting said pixels in said horizontal line in synchronism with said horizontal clock.

6. An LCD panel test system as defined in claim 5, wherein all of said pixel transistors in said selected horizontal line are set to ON during said write period and said high level reference voltage from said video line is charged in said auxiliary capacitors in said selected horizontal line by an operation of said column select shift register in synchronism with said horizontal clock.

7. An LCD panel test system as defined in claim 6, wherein all of said pixel transistors in said selected horizontal line are set to OFF during said discharge period and said low level reference voltage from said video line is provided to data lines and video lines within said LCD panel under test to discharge said voltages stored in said stray capacitors associated with said data and video lines by an operation of said column select shift register in synchronism with said horizontal clock.

8. An LCD panel test system as defined in claim 1, wherein said driver is formed of an operational amplifier for generating said reference voltage.

9. An LCD panel test system as defined in claim 1, wherein said IV conversion circuit includes a first differential amplifier and a second differential amplifier, said first differential amplifier being provided with said reference voltage at its non-inverting terminal from said driver and being connected to said video terminal of said LCD panel at its inverting terminal.

10. An LCD panel test system as defined in claim 9, wherein said first differential amplifier has a first feedback resistor connected between an output thereof and said inverting terminal and a set of second feedback resistor and switch connected in parallel with said first feedback register.

11. An LCD panel test system as defined in claim 10, wherein said second feedback resistor is operative by an ON operation of said switch when supplying said reference voltage to said pixels through said video terminal and said second feedback resistor is inoperative by an OFF operation of said switch when receiving output signals from said LCD panel through said video terminal.

12. An LCD panel test system as defined in claim 9, wherein resistance value of said first feedback resistor is substantially larger than that of said second feedback resistor.

13. An LCD panel test system as defined in claim 1, further includes a plurality of IV conversion circuits when said LCD panel under test has a plurality of video terminals, and a multiplexer for selecting an output signal from said plurality of IV conversion circuits.

14. An LCD (Liquid Crystal Display) panel test system for testing an LCD panel having a large number of pixels in a matrix manner where each of the pixels consists of a pixel transistor and an auxiliary capacitor, comprising:

a sweep timing generator for generating a horizontal clock signal and a vertical clock signal, a test signal for forming a reference voltage, and control signals for driving said pixels in said LCD panel;

a driver for generating said reference voltage in response to said test signal to be supplied to a video terminal of said LCD panel where outputs of said pixels are connected thereto, said reference voltage being a high level in a charge period when charging an auxiliary capacitor in a pixel in a selected row of said matrix through a pixel transistor and said reference voltage being a low level in a discharge period following said charge period when discharging voltages in stray capacitors associated with said pixels;

a current-voltage (IV) conversion circuit for receiving an output signal representing said charge in said auxiliary capacitor in said pixel from said video terminal to convert the same to a corresponding voltage signal;

a sample and hold circuit for sampling said voltage signal from said IV conversion circuit and temporarily holding the sampled voltage therein;

an A/D converter for converting the sampled voltage from said sample and hold circuit to a corresponding digital signal; and an image processor for processing said digital signal from said A/D converter to detect defective pixels in said LCD panel based on relative levels of said output signals from said video terminal.

15. A method of testing an LCD (Liquid Crystal Display) panel having a large number of pixels in a matrix manner where each of the pixels consists of a pixel transistor and an auxiliary capacitor, comprising the steps of:

connecting a common ground terminal of said LCD panel where all of the pixels are commonly connected within said LCD panel to the ground;

supplying a high level reference voltage from a driver to a video terminal of said LCD panel;

driving a pixel transistor ON so that said high level reference voltage is charged in an auxiliary capacitor in a pixel in a selected row of said matrix;

driving said pixel transistor OFF;

supplying a low level reference voltage from said driver to said video terminal to discharge voltages in stray capacitors in said LCD panel;

driving said pixel transistor ON to output a signal in said auxiliary capacitor in said pixel caused by said high level reference voltage;

converting said signal in said auxiliary capacitor to a corresponding voltage signal;

performing a sample and hold operation for said voltage signal;

converting a resultant signal of said sample and hold operation to a corresponding digital signal; and evaluating said digital signal to determine whether said pixel functions correctly or not.

* * * * *